(12) United States Patent
Seo

(10) Patent No.: US 8,071,488 B2
(45) Date of Patent: Dec. 6, 2011

(54) POLYOLEFINE TARPAULIN COMPOSITION AND PREPARING METHOD THEREOF

(75) Inventor: Seung Min Seo, Seoul (KR)

(73) Assignee: Wonpoong Corporation, Seoul (KR)

( * ) Notice: Subject to any disclaimer, the term of this patent is extended or adjusted under 35 U.S.C. 154(b) by 393 days.

(21) Appl. No.: 12/224,553

(22) PCT Filed: Mar. 18, 2008

(86) PCT No.: PCT/KR2008/001515
§ 371 (c)(1), (2), (4) Date: Aug. 29, 2008

(87) PCT Pub. No.: WO2009/008583
PCT Pub. Date: Jan. 15, 2009

(65) Prior Publication Data
US 2010/0233442 A1    Sep. 16, 2010

(30) Foreign Application Priority Data

Jul. 11, 2007   (KR) .................. 10-2007-0069535

(51) Int. Cl.
*B32B 27/12*    (2006.01)
*B32B 27/32*    (2006.01)

(52) U.S. Cl. ............. 442/59; 442/64; 442/71; 442/88; 442/398; 428/521

(58) Field of Classification Search ............. 442/59–92, 442/394–399; 428/343, 355 R
See application file for complete search history.

(56) References Cited

U.S. PATENT DOCUMENTS

| | | | | |
|---|---|---|---|---|
| 3,957,919 | A * | 5/1976 | Von Bodungen et al. | 524/504 |
| 5,626,944 | A * | 5/1997 | Rasmussen | 428/172 |
| 6,420,033 | B1 * | 7/2002 | Numrich et al. | 428/421 |
| 6,475,633 | B1 * | 11/2002 | Robert et al. | 428/516 |
| 6,547,917 | B1 * | 4/2003 | Misiak et al. | 156/331.2 |
| 7,641,964 | B2 * | 1/2010 | Swei et al. | 428/215 |
| 2007/0193167 | A1 * | 8/2007 | Bruce et al. | 52/408 |

FOREIGN PATENT DOCUMENTS

| | | |
|---|---|---|
| JP | 10-76610 | 3/1998 |
| KR | 10-2004-0074228 | 8/2004 |
| WO | 2006/052045 | 5/2006 |

OTHER PUBLICATIONS

International Search Report dated Jun. 26, 2008 issued in connection with International Application No. PCT/KR2008/001515 corresponding to the present U.S. application.

* cited by examiner

*Primary Examiner* — Angela Ortiz
*Assistant Examiner* — Jennifer Steele
(74) *Attorney, Agent, or Firm* — Wenderoth, Lind & Ponack, L.L.P.

(57) ABSTRACT

A polyolefin tarpaulin composition for photographic printing provides a reinforced structure with united strength in the outside of the tarpaulin, and provides a superior processing property by allowing a photographic print sheet to be easily coupled to the outside of the tarpaulin. The generation of a pollutant that is a problem associated with PVC tarpaulin is prevented, and an eco-friendly material is used which does not harm the human body and which can be recycled after use.

7 Claims, 9 Drawing Sheets

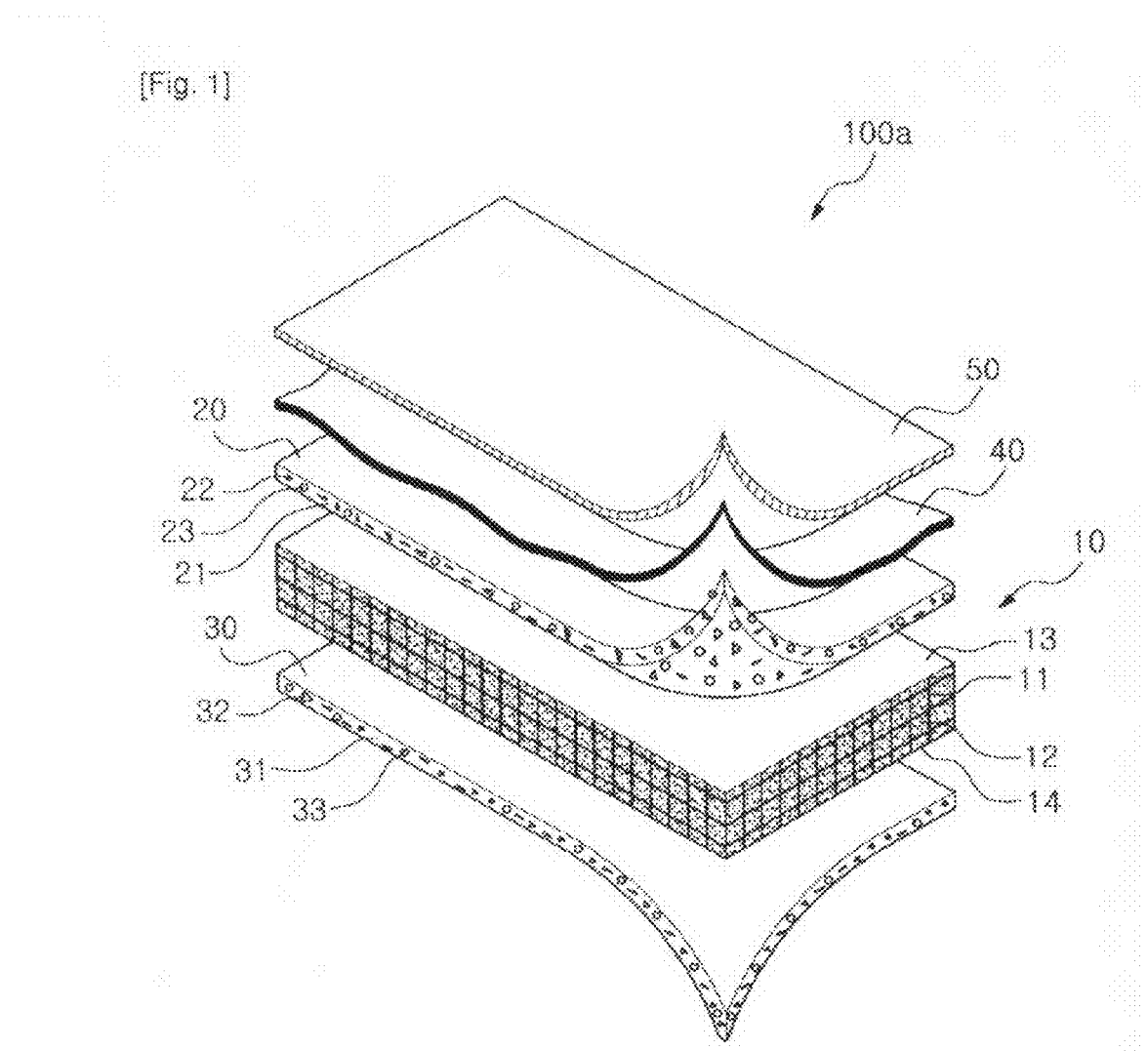
[Fig. 1]

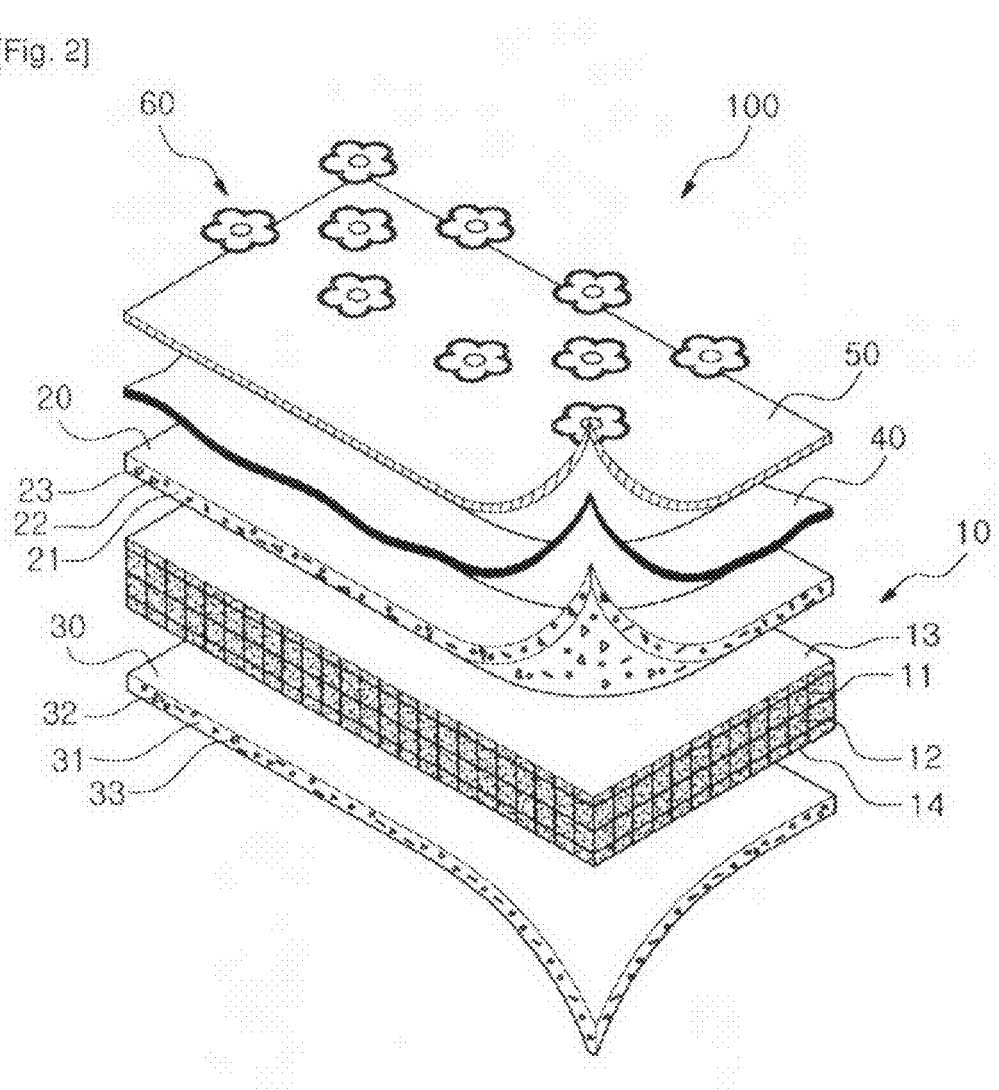

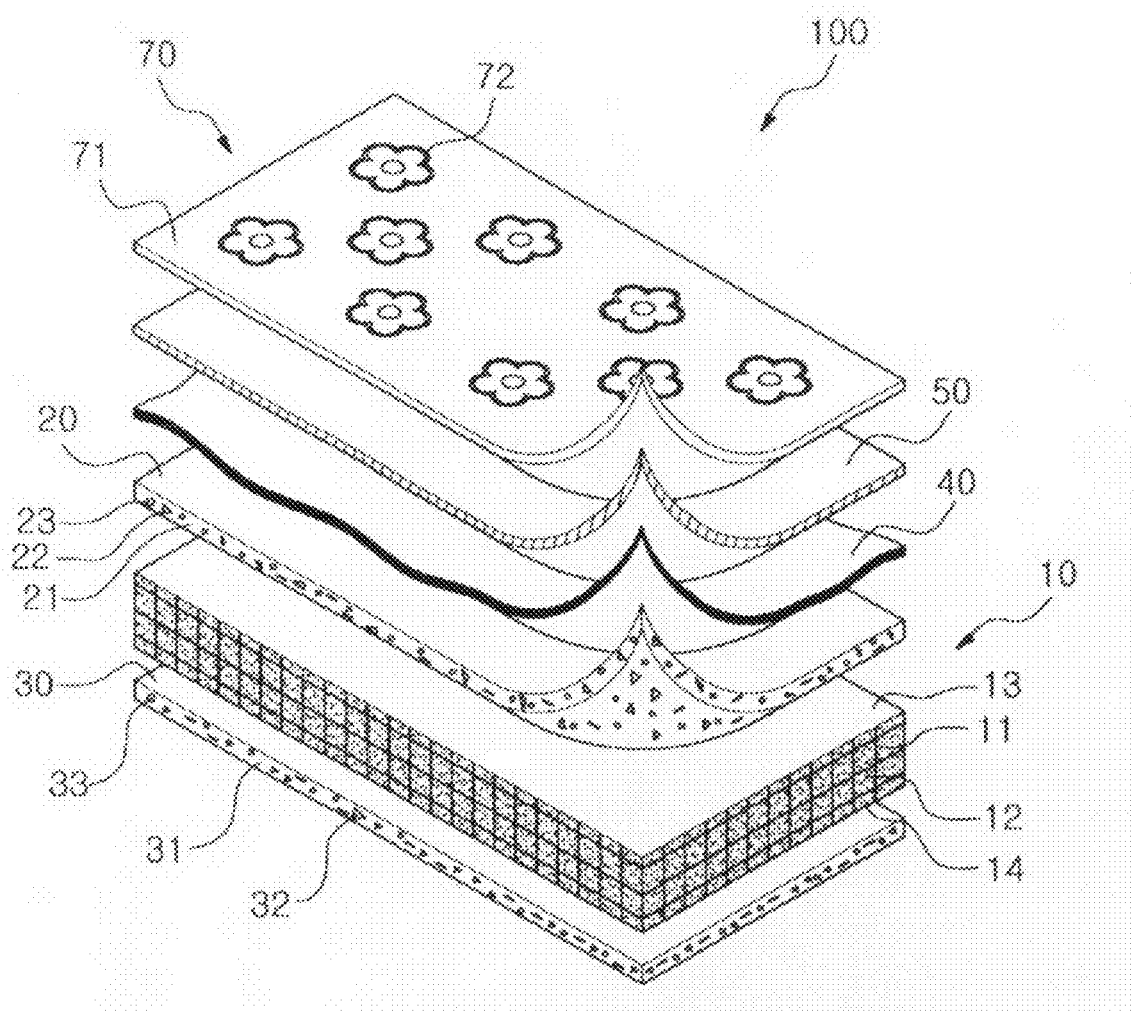
[Fig. 3]

[Fig. 4]
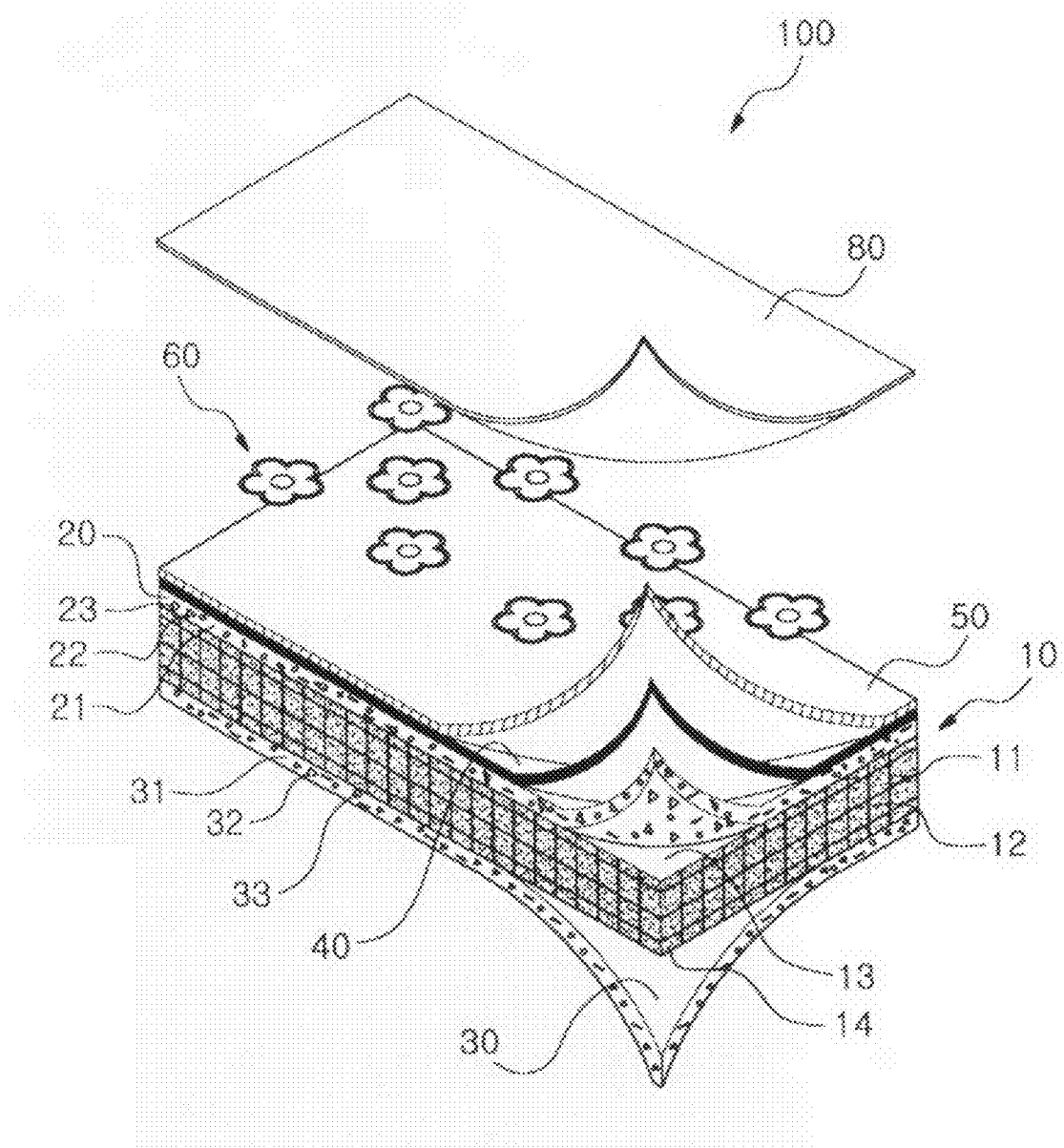

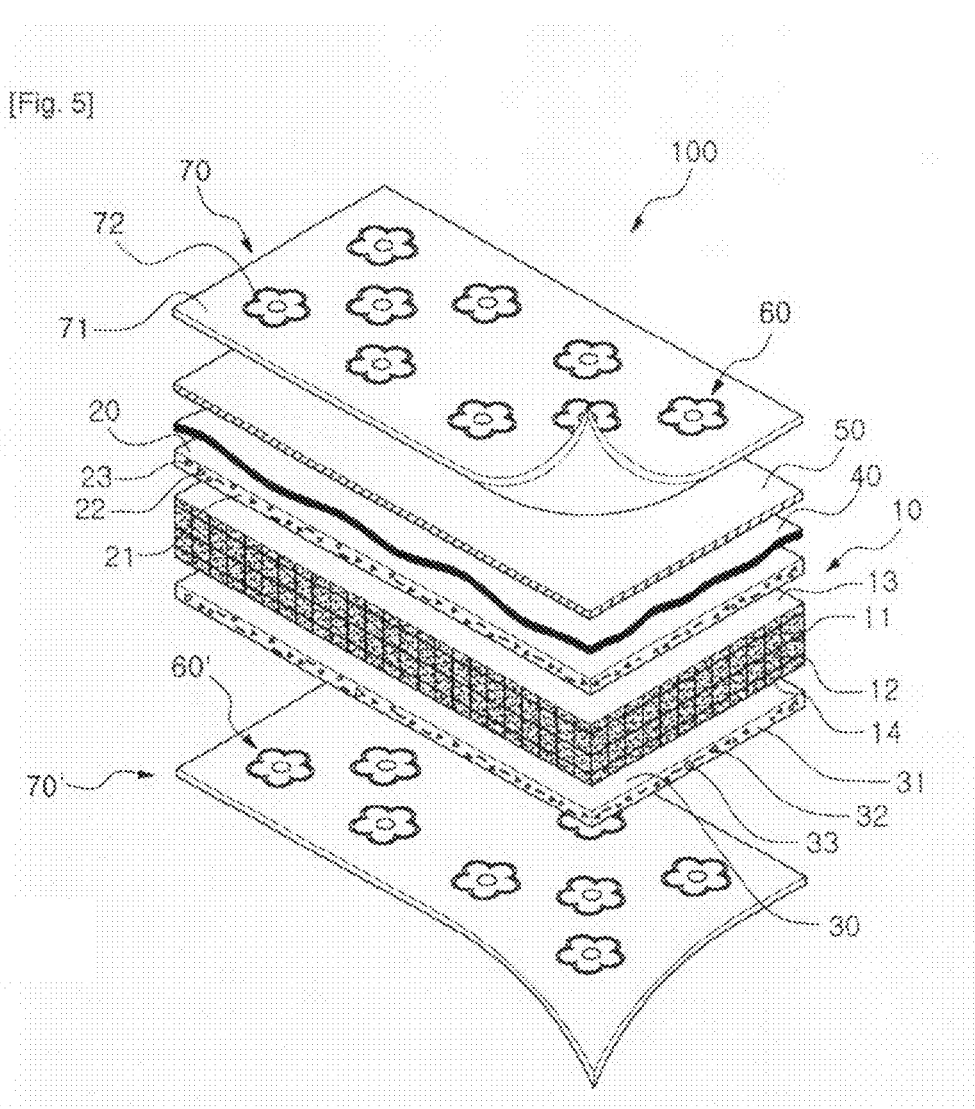

[Fig. 6]
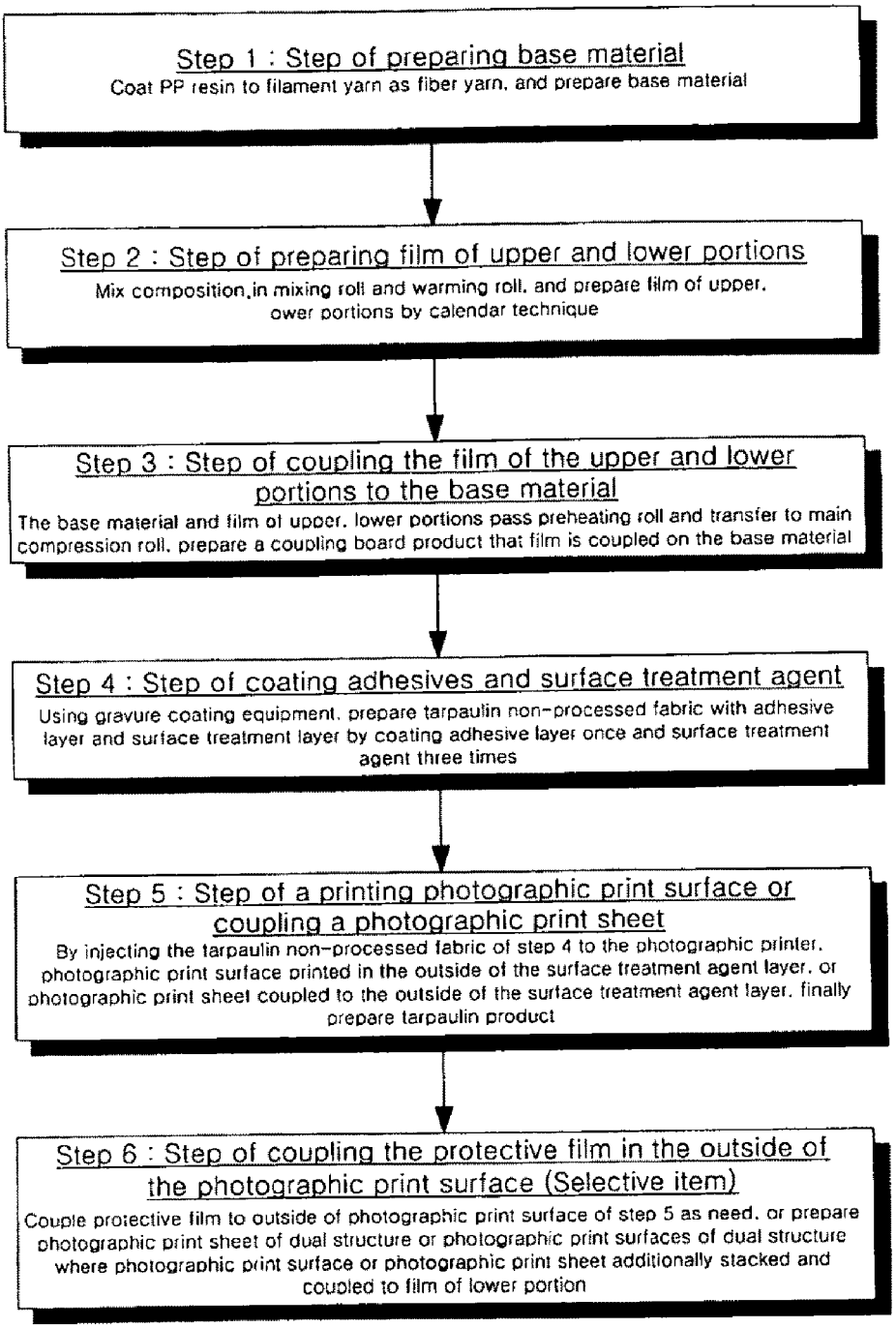

[Fig. 7]
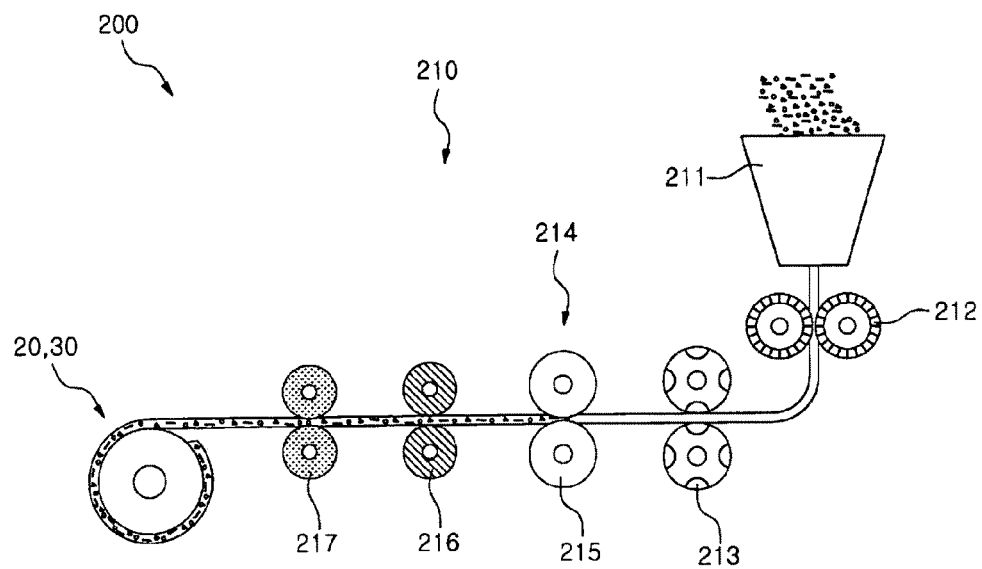
[Fig. 8]
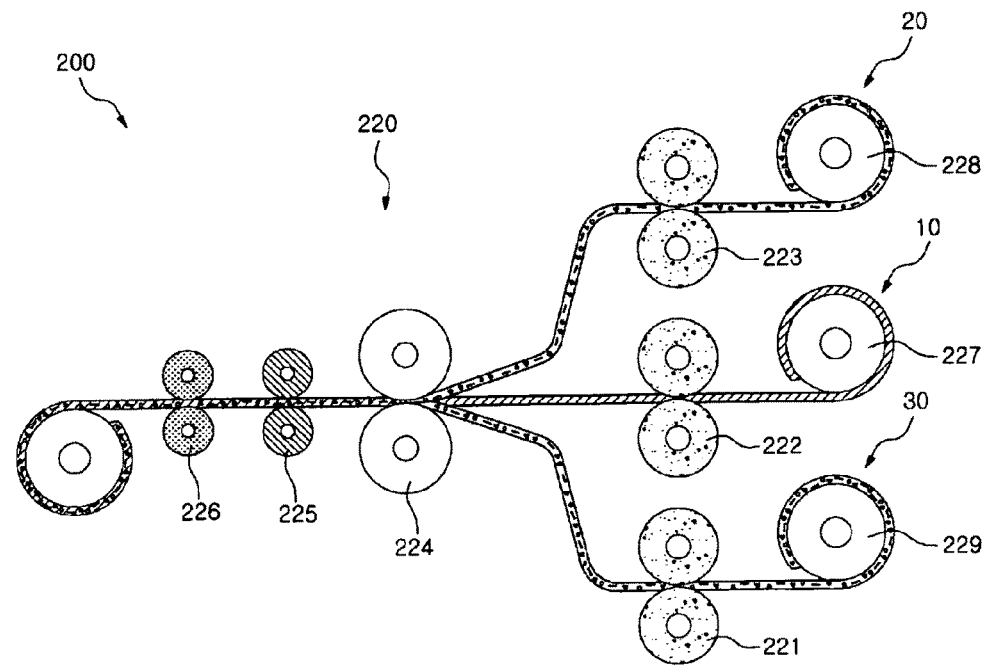

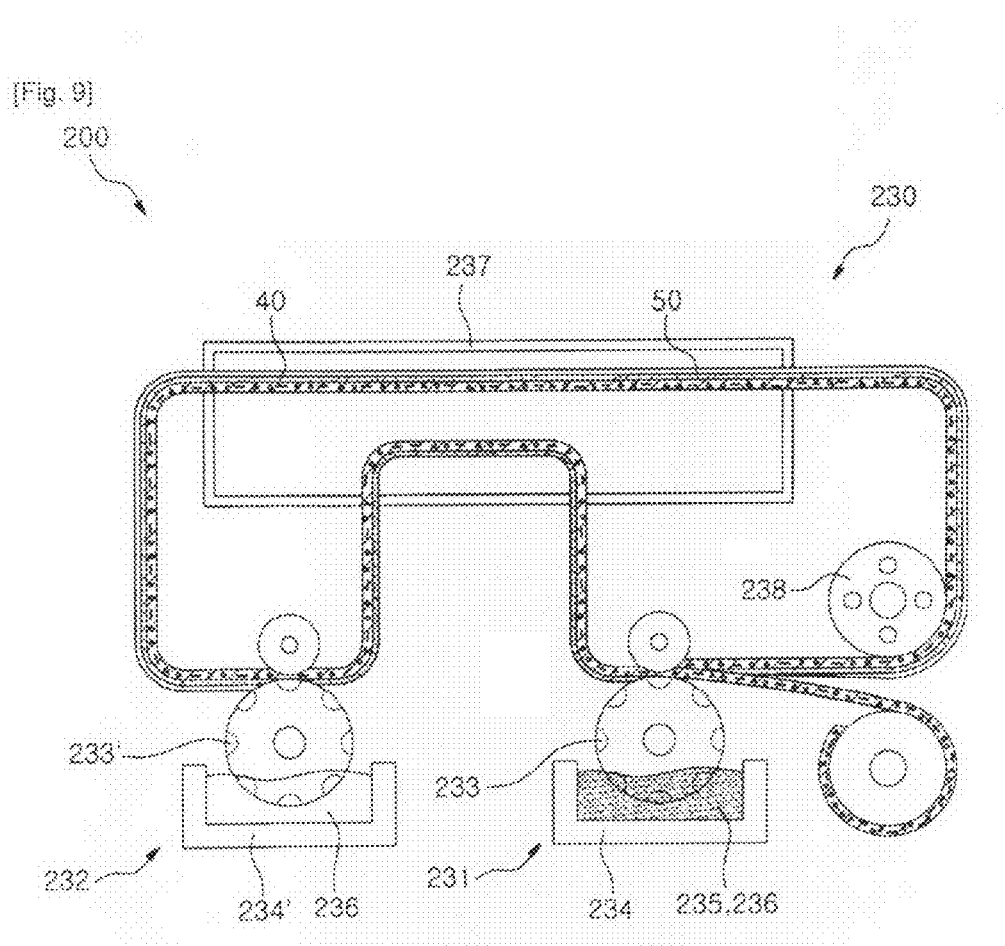

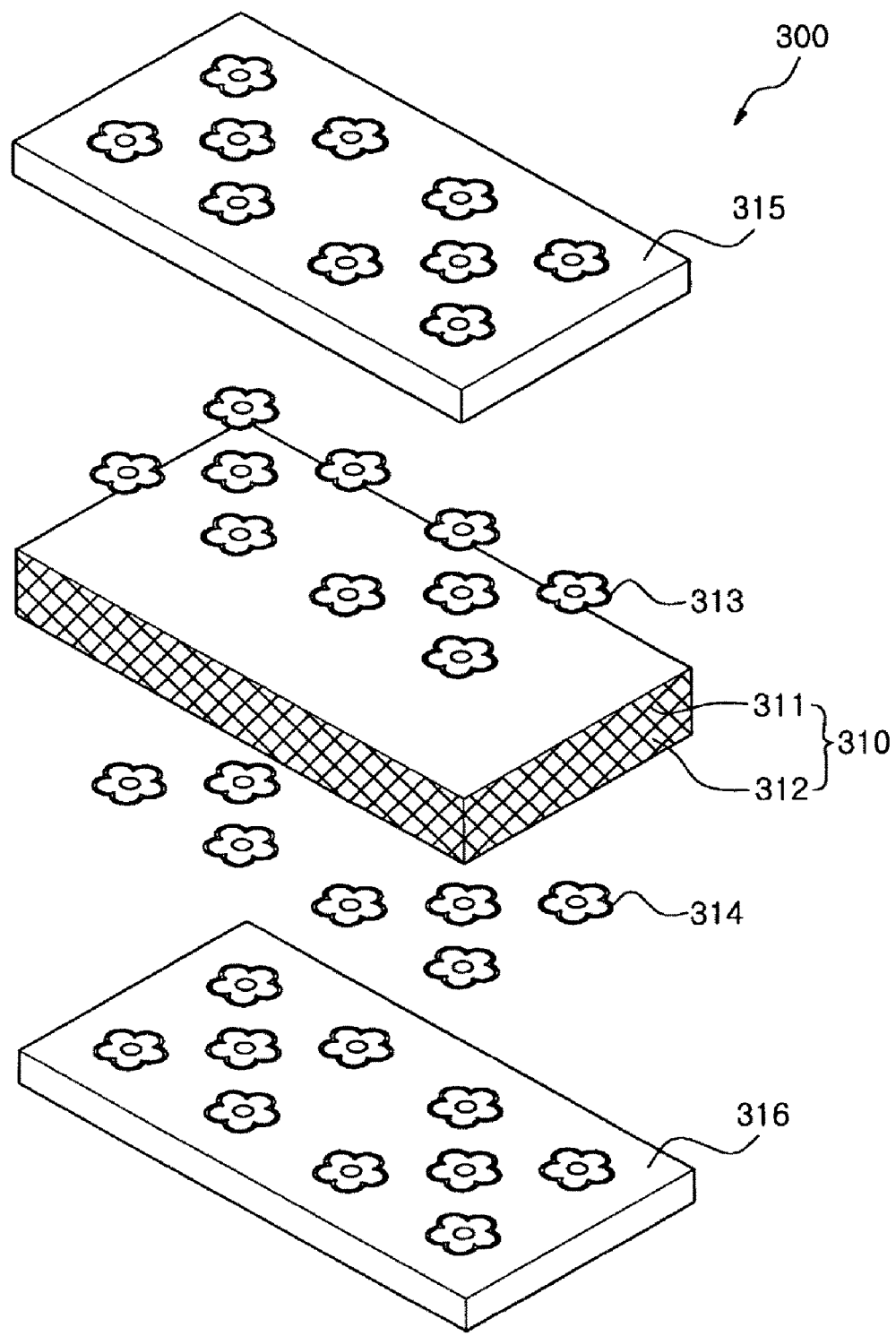
[Fig. 10]

POLYOLEFINE TARPAULIN COMPOSITION AND PREPARING METHOD THEREOF

BACKGROUND OF THE INVENTION (1) Field of the Invention

The present invention relates to a polyolefin tarpaulin composition and preparing method thereof (thermo-plastic polyolefin based tarpaulin and preparing method thereof).

In general, a photographic printing surface, which is advertising or published matters printed via a photographic printer, is formed at the outside of a tarpaulin as a base material in textiles. The tarpaulin is used for photographic printing where a photographic printing sheet as a printed sheet having the printed photographic printing surface is coupled. A tarpaulin of PVC material that the photographic printing surface may be easily printed has been mainly used because the photographic printing surface is easily printed to the base material by the polarity in the native properties of matter of the material when printing the photographic printing surface to the base material of PVC.

(2) Description of Related Art

As illustrated in FIG. 10, in the conventional tarpaulin (300), the tarpaulin used for base material (310) is a water proof cloth in the states that PVC or PE resin (312) has impregnated in fiber yarn.

The conventional tarpaulin consists of: a tarpaulin (300) for photographic printing having a dual printing system such that advertising matters such as advertising expressions or patterns are printed on photographic printing surfaces (313, 314) at upper and lower portions, respectively, of the base material (310) via the photographic printer. A tarpaulin for photographic printing having a dual coupling structure such that the photographic printing sheets (315, 316) in which advertising matters such as advertising expressions or patterns are printed on the photographic printing surfaces (313, 314) at upper and lower portions of the base material (310) are stacked and coupled, respectively; in other words, the structure is such that a plurality of the same photographic printing surfaces (313, 314) are printed at the upper and lower portions of the base material (310), or the photographic print sheets (315, 316) are stacked and coupled by the dual structure.

BRIEF SUMMARY OF THE INVENTION

Technical Problem

In the daytime, the contents of advertising matters are represented clearly to the outside by a plurality of photographic print surfaces (313, 314) while in the night time, a light source of an illuminator positioned in the back side of the tarpaulin (300) is illuminated in a plurality of photographic print surfaces (313, 314) or a plurality of photographic print sheets (315, 316) wherein the contents of advertising matters are represented to the outside, which causes problems of cost rise and drop off in work efficiency.

Especially, in the case of the tarpaulin of PVC material, it can't be recycled because endocrine disruptor as a pollutant is exhausted. Also, the problem of environmental pollution due to exhausting of a pollutant in disposal arises, and printing having reduces weather resistance causes the problem of discoloration of the product.

In case of the tarpaulin of polyethylene material, it is very difficult to form the photographic print surface in the outside of the base material, because photographic print ink is not easily absorbed in the base material in view of a property of matter.

Due to a simple PE material without an elastomer element, the product in high solidity is stiff, which causes reducing of work efficiency and dropping of cold-proof, weather-ability and durability.

Accordingly, the tarpaulin for photographic printing of the present invention provides a reinforced structure of united strength in the outside of the tarpaulin, which provides a superior processing property that the photographic print sheet is easily coupled to the outside of the tarpaulin; due to the constitution of a single photographic print surface, the photographic print surface is clearly printed, and thus the prime cost is reduced and work efficiency improved.

At the same time, it prevents crack states due to the elastic force of the base material, which reinforces cold-proof, weather-ability, and abrasion resistance.

Especially, the polyolefin tarpaulin composition and preparing method thereof (thermo-plastic polyolefin based tarpaulin and preparing method thereof) prevents the generation of a pollutant and does not harm the human body; moreover, it enables 100% recycling as recycling raw material for reducing the cost after use.

Technical Solution

In view of such problems, the present invention provides the polyolefin tarpaulin composition and preparing method thereof (thermo-plastic polyolefin based tarpaulin and preparing process thereof). The tarpaulin for photographic printing of the present invention provides a reinforced structure with united strength in the outside of tarpaulin, which represents a superior processing property that photographic print sheet maybe easily coupled to the outside of tarpaulin. Due to the constitution of a single photographic print surface, the photographic print surface is clearly printed, and therefore cost is reduced and work efficiency improved.

At the same time, the polyolefin tarpaulin composition and preparing method thereof (thermo-plastic polyolefin based tarpaulin and preparing process thereof) prevents crack states due to the elastic force of the base material, which reinforces cold-proof, weather-ability, and abrasion resistance.

Especially, it prevents the generation of a pollutant that is a problem in the PVC tarpaulin of the related art by creating an eco-friendly material and does not harm the human body, and enables 100% recycling as recycling raw material for reducing the cost after use.

Advantageous Effects

According to the polyolefin tarpaulin composition and preparing method thereof (thermo-plastic polyolefin based tarpaulin and preparing process thereof), the tarpaulin for photographic printing of the present invention provides a reinforced structure with united strength, in the outside of tarpaulin, which represents a superior processing property that photographic print sheet maybe easily coupled to the outside of tarpaulin. Due to the constitution of a singular number of the photographic print surface, the photographic print surface is clearly printed, and therefore cost is reduced and work efficiency improved.

At the same time, the polyolefin tarpaulin composition and preparing method thereof (thermo-plastic polyolefin based tarpaulin and preparing process thereof) prevents crack states due to the elastic force of the base material, which reinforces cold-proof, weather-ability, and abrasion resistance.

Especially, it prevents the generation of a pollutant that is a problem in PVC tarpaulin of the related art by creating eco-friendly material and does not harm the human body, and enables 100% recycling as recycling raw material for reducing the cost after use.

BRIEF DESCRIPTION OF THE DRAWINGS

FIG. 1 is a perspective view illustrating disassembled tarpaulin non-processed fabric according to the present invention.

FIG. 2 is a perspective view illustrating the disassembled tarpaulin as a processed product of the present invention in which a photographic print surface is provided with the tarpaulin non-processed fabric.

FIG. 3 to FIG. 5 are perspective views illustrating another embodiment of the tarpaulin of the present invention.

FIG. 6 is a schematic view illustrating an entire preparing process of the tarpaulin of the present invention.

FIG. 7 is a schematic view illustrating a preparing process of films of the upper and lower portions as a part of the tarpaulin of the present invention.

FIG. 8 is a schematic view illustrating a preparing process of films in the upper and lower portions coupled to a base material of the present invention.

FIG. 9 is a schematic view illustrating a preparing process of the adhesive layer and the surface treatment layer that the adhesives and the surface treatment agent are coated with the upper portion film in FIG. 8.

FIG. 10 is a perspective view illustrating a tarpaulin in the related art.

DETAILED DESCRIPTION OF THE INVENTION

The present invention relates to a polyolefin tarpaulin composition and preparing method thereof (thermo-plastic polyolefin based tarpaulin and preparing process thereof), wherein the tarpaulin for photographic printing provides a reinforced structure with united strength in the outside of the tarpaulin, which provides a superior processing property that a photographic print sheet maybe easily coupled to the outside of tarpaulin.

Due to the constitution of a single photographic print surface, the photographic print surface is clearly printed, and therefore the prime cost is reduced and work efficiency improved.

At the same time, the polyolefin tarpaulin composition and preparing method thereof (thermo-plastic polyolefin based tarpaulin and preparing process thereof) prevents crack states due to the elastic force of the base material, which reinforces cold-proof, weather-ability, and abrasion resistance.

Especially, it prevents the generation of a pollutant that is a problem in the PVC tarpaulin of the related art by creating an eco-friendly material and does not harm the human body, and enables 100% recycling as recycling raw material for reducing the cost after use.

The tarpaulin of the present invention includes:

1) a base material impregnated with polypropylene resin in the non-woven or filament yarn as fiber yarn;

2) films of upper and lower portions, which composed of the composition of the invention coupled in the upper and lower portions of the base material;

3) an adhesive layer coated with adhesives in the outsides of the upper portion film;

4) a surface treatment agent layer coated with the surface treatment agent in the outside of the adhesive layer; and 5) a photographic print sheet where a photographic print surface is printed in the sheet, or a photographic print surface directly printed in the photographic printer in the upper portion of the surface treatment agent layer of the tarpaulin non-processed fabric, which is coupled and accommodated as the tarpaulin of a processing product of the present invention.

Hereinafter, the structure of thermo-plastic polyolefin based tarpaulins according to the present invention will be explained in detail with reference to accompanying drawings.

As depicted in FIG. 1, thermo-plastic polyolefin based tarpaulin non-processed fabric (100a) of the present invention includes a base material (10) impregnated with polypropylene resin (12) in the non-woven or filament yarn (11) as fiber yarn with a thickness of 150 to 3000 denier;

thermo-plastic polyolefin based complex resin (21, 31) as a main material that reinforces cold-proof and abrasion resistance to prevent crack states for accommodating elastic force in the upper and lower portions of the base material (10), and that clearly prints on the surface by print ink of the photographic print surface (60: referring to FIG. 2);

the film of the upper and lower portions (20, 30) as thermo-plastic polyolefin based elastic body (elastomer) composed of filler for filling, an ultraviolet light blocker, an antioxidant, and a static electricity blocker, which is coupled as sub-material (22, 32);

an adhesive layer (40) applied by polyurethane-cyano acrylate adhesives of 5 to 20% solid for reinforcing adhesive power of the photographic print sheet (70) or the photographic print surface (60), when the photographic print surface (60: referring to FIG. 2) as advertising or published matter directly printed in the photographic printer, or the photographic print sheet (70: referring to FIG. 3) as print sheet that the photographic print surface (60) is printed on the sheet, coupling in the outside of the upper portion film (20);

a surface treatment agent layer (50) of 20 to 30% solid composed of fluorine acrylic resin for improving print processing property and weather-ability by accommodating the polarity in printing the photographic print surface (60) in the outside of the adhesive layer (40).

The thermo-plastic polyolefin based elastic body composition for composing the film of the upper and lower portions (20, 30) includes: setting all the film composition of the upper and lower portions on the basis of 100 wt %, thermo-plastic polyolefin based elastomer resin (TPE resin) as thermo-plastic polyolefin based resin, that is included 55 to 65 wt % of rubber, 10 to 30 wt % of polypropylene, and 15 to 25 wt % of polyethylene;

thermo-plastic polyolefin based complex resin 65 to 85 wt % as a main material with linear low-low density polyethylene resin (LLD PE) with 0.918 to 0.922 of density and 0.8 to 1.2 of melting index composed of 40 to 60 wt % respectively;

Talc or CaCo3 as filler for filling 14.7 to 30 wt %, which is sub-material; and

UV Stabilizer 0.1 to 2.0 wt % of bis sebaceate group or poly-tetra methylbutylamino group as an ultraviolet light blocker, Phenol free processing Stabilizer 0.1 to 1.5 wt % of phosphate & hydroxylamine group as an antioxidant, 0.1 to 1.5 wt % of monoglyceride as a static electricity blocker, which are additives.

The adhesive layer (40) consists of resin solid 5 to 20% of adhesives where polyurethane-cyanacrylate based resin 5 to 20 wt % is dissolved in 80 to 95 wt % of a solvent in a state that a sort or more than a sort selected from a group consisting of methylethylicketon (MEK), dimethylformicamaid (DMF) or ethylene acetate (EA) is mixed.

Also, the surface treatment agent layer (50) consists of solid 20 to 30% of surface treatment agent where fluorine-acryl resin 20 to 30 wt % is dissolved in 70 to 80 wt % of a solvent in a state that a sort or more than a sort selected from methylethylicketon (MEK), dimethylformicamaid (DMF) is mixed.

In the composition, about the film of the upper and lower portions (20, 30) as thermo plastic polyolefin based elastic body 100 wt % as needed, a resistant in states that a sort or more than a sort selected in Bromine based ethylene bis-tetrabromophthalim, Sb2O3 or Mg(OH)2 based magnesium hydroxide maybe mixed, which may be composed of film of the upper and lower portions with resistant function.

As a coloring agent for coloring, black based carbon black or blue is used.

The thermo-plastic polyolefin based elastomer resin (TPE resin) which reinforces cold-proof and abrasion resistance to prevent crack states for accommodating elastic force clearly prints on the surface using print ink.

When using thermo-plastic polyolefin based elastomer resin solely, it causes glutinous states, which reduces work efficiency.

For preventing that, the thermo-plastic polyolefin based complex resin of the present invention composes of thermo-plastic polyolefin based elastomer resin 40 to 60 wt %, and linear low-low density polyethylene resin (LLD PE) 40 to 60 wt %, which is a complex resin structure mixed with linear low-low density polyethylene resin (LLD PE) to thermo-plastic polyolefin based elastomer resin.

Preferably, thermo-plastic polyolefin based complex resin which is composed of weight ratio of 1:1, i.e. thermo-plastic polyolefin based elastomer resin 50 wt % and linear low-low density polyethylene resin (LLD PE) 50 wt % is used for 65 to 85 wt %, setting all the film of the upper and lower portions composition on the basis of 100 wt %.

As depicted in FIG. 2, a photographic print surface as advertising or published matter by printing the photographic print surface (60) directly in the photographic printer is provided with the upper portion of the surface treatment agent layer 50 of tarpaulin non-processed fabric (100a: referring to FIG. 1) comprised of the base material 10, the film of the upper and lower portions (20, 30), an adhesive layer (40), and a surface treatment agent layer (50).

Hereinafter, another embodiment of the thermo-plastic polyolefin based tarpaulin of the present invention will be explained.

As depicted in FIG. 3, photographic print sheet (70) where photographic print surface (72) as advertising or published matter is printed in the sheet is coupled to the upper portion of the surface treatment agent layer (50) of tarpaulin non-processed fabric (100a: referring to FIG. 1) which is comprised of the base material (10), film of the upper and lower portions (20, 30), the adhesive layer (40), and the surface treatment agent layer (50).

As depicted in FIG. 4, the protect film (80) as marking film maybe constituted in a coupled structure in the outside of the photographic print surface 60 for protecting the photographic print surface (60) in FIG. 2.

As depicted in FIG. 5, the photographic print surface (60) in FIG. 2 or photographic print sheet (70) in FIG. 3 maybe composed of photographic print surfaces (60, 60') or photographic print sheets (70, 70') of dual structure formed in the outside of the film of the upper and lower portions (20, 30), respectively.

Hereinafter, a preparing process of thermo-plastic polyolefin based tarpaulins according to the present invention will be explained in detail with reference to accompanying drawings.

FIG. 6 is a schematic view illustrating an entire preparing process of the tarpaulin of the present invention.

FIG. 7 is a schematic view illustrating a preparing process of films of the upper and lower portions as a part of the tarpaulin of the present invention.

FIG. 8 is a schematic view illustrating a preparing process of films in the upper and lower portions coupled to a base material of the present invention.

FIG. 9 is a schematic view illustrating a preparing process of the adhesive layer and the surface treatment layer that the adhesives and the surface treatment agent are coated with the upper portion film in FIG. 8.

As depicted in FIG. 6 to FIG. 9, preparing method according to the present invention follows five preparing steps, and one more step may be added as needed.

Step 1: Step of Preparing Base Material

The base material (10) in thickness of 0.1 to 1.2 where polypropylene resin is coated in the filament yarn or non-woven is prepared by double sided coating the polypropylene resin in the filament yarn or non-woven as fiber yarn of 150 to 3000 denier in thickness.

Step 2: Step of Preparing Film of the Upper and Lower Portions

As depicted in FIG. 7, setting all the film composition of the upper and lower portions on the basis of 100 wt %, thermo-plastic polyolefin based elastomer resin (TPE resin) where rubber 55 to 65 wt % is contained in the polypropylene 10 to 30 wt % and polyethylene 15 to 25 wt %; thermo-plastic polyolefin complex resin 65 to 85 wt % as main material where linear low-low density polyethylene resin (LLD PE) of 0.918 to 0.922 density and 0.8 to 1.2 melting index is composed of 40 to 60 wt %, respectively; and filler Talc or CaCo3 14.7 to 30 wt % for filling as sub-material; UV Stabilizer 0.1 to 2.0 wt % of bis sebaceate group as an ultraviolet light blocker, phenol free processing Stabilizer 0.1 to 1.5 wt % of phosphate & hydroxylamine group as an antioxidant, 0.1 to 1.5 wt % of mono-glyceride as a static electricity blocker, which is additives; injecting the above material to Banbury mixer (211), and kneading for 2 minutes at 140 to 160° C. firstly after transferring mixture blended at 140 to 160° C. for 5 minutes to the mixing roll (212) of 140 to 160° C. in preheating temperature, then kneading at 140 to 160° C. secondly for 2 minutes after transferring to the warming roll (213) of 140 to 160° C. in preheating temperature, finally transferring that to the calendar (214);

after preparing the film of 0.1.about.0.4 mm in thickness on a lower portion roll (215) preheated in 150 to 170° C. at the calender, rolling and cooling thru the emboss roll (216) and cooling roll (217), the upper portion film 20 or lower portion film 30 of the present invention is prepared.

Step 3: Step of Coupling the Film of the Upper and Lower Portions to the Base Material As depicted in FIG. 8, after loading the base material (10) prepared at the first step to the load roll 1 (227) and loading the film of the upper and lower portions prepared at the second step to the load roll 2, 3 (228, 22, the base material (10) is passed in the base material preheating roll (222) preheated in 100 to 120° C. to transfer to the main compression roll (224);

the upper portion film (20) is passed in the upper portion film preheating roll (223) preheated in 70 to 80° C. to transfer to the main compression roll (224);

the lower portion film (30) is passed in the lower portion film preheating roll (221) preheated in 80 to 90° C. to transfer to the main compression roll (224);

the film of the upper and lower portions (20, 30) in the upper and lower portions of the base material (10) is laminated in the main compression roll (224) preheated in 140 to 160° C. and then becomes veneer board, final rolling and cooling thru the emboss roll (225) and cooling roll (226), 0.3 to 2.0 mm in thickness of a coupling board product that the film of the upper and lower portions (20, 30) is coupled on the base material (10) is prepared.

Step 4: Step of Coating Adhesives and the Surface Treatment Agent

As depicted in FIG. 9, in the 120 mesh coating roll (233) that 120 intaglio depressed groove for coating thickness control is carved inside 1 inch square of coating roll as a gravure 1 coating equipment (231), the polyurethane-cyano acrylate adhesives (235) loaded in the bath (234) is applied and the coupling board product is injected, and the adhesive layer (40) as 5 to 20 μm of adhesive solid is coated with 0.01 to 0.03 mm in thickness in the upper or lower portion of the veneer board.

After coating, that is transferred to the dry oven (237) in 60 to 80° C. of temperature and 10 to 20 m/min of transfer speed and then becomes dry, transferring to the 70 mesh coating roll (233') that 70 intaglio depressed groove for coating thickness control is carved inside 1 inch square of coating roll as a gravure 2 coating equipment (232).

And the surface treatment agent (236) composed of fluorine-acryl resin loaded in the bath (234') is applied to the 70 mesh coating roll, then coating one time the surface treatment agent layer 50 of 20 to 30 μm solid of the surface treatment agent in the outside of the adhesive layer (40).

After coating the surface treatment agent, that is transferred to the dry oven (237) of 60 to 80° C. in temperature and 10 to 20 m/min of transfer speed and then becomes dry to rewind by the gravure 2 coating equipment (232) for coating 2, 3 times the surface treatment agent layer (50) like the same constitution above, which produces 0.335 to 2.1 mm in whole thickness of tarpaulin non-processed fabric (100*a*) of the present invention provided with 0.025 to 0.07 mm in thickness of the surface treatment agent layer.

1st coating: 1st (120 MESH-adhesives)+2nd (70 MESH-surface treatment agent)
2nd coating: 3rd (70 MESH-surface surface treatment agent)+4th (70 MESH-surface treatment agent)
3rd coating: 5th (70 MESH-surface treatment agent)+6th (70 MESH-surface treatment agent)

Step 5: Step of Printing a Photographic Print Surface or Coupling a Photographic Print Sheet By injecting the tarpaulin non-processed fabric (100*a*) of step 4 to the photographic printer, the photographic print surface (60) is directly printed in the outside of the surface treatment agent layer (50), or photographic print sheet (70) as the print sheet that the photographic print surface is printed in the sheet is coupled to the outside of the surface treatment agent layer (50), which is the finally prepared tarpaulin (100) as a processed product of the present invention.

Step 6: Step of Coupling the Protective Film in the Outside of the Photographic Print Surface (Selective Item)

As needed, protective film (80) as marking film for preventing scratch phenomenon and shock of the photographic print surface is coupled to the outside of the photographic print surface (60) in the tarpaulin of step 5, which is the tarpaulin (100) prepared.

Also, wherein the tarpaulin (100) provided with photographic print sheets (70, 70') of dual structure or photographic print surfaces (60, 60') of dual structure maybe prepared whereby the dual structure is the one that the photographic print surface (60), or the photographic print sheet (70) additionally stacked and coupled to the outside of the lower portion film (30).

According to the knife coater or comma coater technique not the gravure technique where the surface treatment agent composed of fluorine-acryl resin loaded in the bath is coated 1 to 3 times to the (70) mesh coating roll carved out of intaglio depressed groove, the surface treatment agent layer (50) from step 4 maybe prepared by the first coating of the surface treatment agent (236).

According to the product constitution and composition of film in the upper and lower portions described above, the thermo-plastic polyolefin based tarpaulin of the present invention allows the photographic print surface to be easily absorbed and printed in the outside of the base material by the polarity as a natural property of matter of PVC tarpaulin.

The thermo-plastic polyolefin based complex resin as a main material that reinforces cold-proof, abrasion resistance to prevent crack states for accommodating elastic force in the upper, lower portions of the base material (10), and that clearly prints on the surface by print ink of the photographic print surface (60). By an adhesive layer (40) applied by polyurethane-cyano acrylate adhesives of 5 to 20% solid for reinforcing adhesive power of photographic print sheet (70) or the photographic print surface (60), when printing the photographic print surface or coupling the photographic print sheet, printing or coupling is easy by reinforcing adhesive power of the photographic print surface (60) or the photographic print sheet (70), and providing with the surface treatment agent layer (50) of 20 to 30% solid composed of fluorine acrylic resin for improving print processing property and weatherability by accommodating the polarity in printing the photographic print surface (60) in the outside of the adhesive layer (40).

Without the polarity as natural property of matter, the photographic print surface (60) as advertising or published matter is easily printed. Moreover, a singular member is provided which does not have the plural print surfaces of the related art, and then the singular member of photographic print (60) or print sheet (70) is coupled to the outside of the treatment agent layer (50) of the tarpaulin of the present invention.

In the daytime, the contents of advertising matter are represented clearly to the outside, and at night a light source of an illuminator can be positioned on the back side of the tarpaulin (300) of the invention to illuminate a singular photographic print surface or a singular photographic print sheet, so the contents of advertising matter are represented to the outside, which improves work efficiency and reduces the cost.

Especially, the present prevents the generation of a pollutant that is a problem in PVC tarpaulin of the related art by creating eco-friendly material and does not harm the human body, and enables 100% recycling as recycling raw material for reducing the cost after use.

Also, for reinforcing adhesive power and preventing deformation in heating when executing coupling work of the base material (10) as polypropylene fabric and the film (20) of the upper and lower portions, proceed coupling work in film of the upper/lower portion preheating roll (221,223), base preheating roll (222), main compression roll (224) in low temperature of 70 to 160° C., and then it prevents deformation in heating with different temperature corresponding to individual aspects and reinforces the adhesive power.

Hereinafter, the embodiments according to the present invention will be explained in more detail with reference to accompanying drawings.

The embodiment 1 illustrates the tarpaulin of the present invention which is composed of an adhesive layer, a surface treatment agent layer, and upper/lower portion films with a base material and film composition, and is prepared by the preparing process of the invention wherein a photographic print surface is directly printed on the upper portion of the surface treatment agent layer in the photographic printer.

The embodiment 2 illustrates the tarpaulin of the present invention which is composed of an adhesive layer, a surface treatment agent layer, and upper/lower portion film with the base material and film composition, and is prepared by preparing process of the invention, and that is coupled to the photographic print sheet as a print sheet where a photographic print surface is printed on the upper portion of the surface treatment agent layer in the photographic printer.

The comparison example 1 represents a PVC tarpaulin on the market, which has a base material coated with the PVC resin in the prior PET fabric sheet and the photographic print surface printed in dual structure in the upper and lower portions of the base material.

The comparison example 2 represents a PE tarpaulin on the market, which has a base material coated with the LDPE resin in the prior HDPE YARN fabric sheet and the photographic print surface printed in dual structure in the upper and lower portions of the base material.

Embodiment 1

Preparing polypropylene filament yarn textiles that polypropylene resin is double sided coated in the filament yarn of 300 denier in thickness; TPE complex resin 79 wt % composed of TPE resin 50 consisting of polypropylene 20 wt %, polyethylene 20 wt % and rubber 60 wt %, and linear low-low density polyethylene resin (LLD PE) 50 wt %;

filler Talc 16 wt %; bis sebaceate group of an ultraviolet light blocker 0.6 wt %, phenol free processing stabilizer 0.2 wt % as an antioxidant, 0.2 wt % of monoglyceride as a static electricity blocker; injecting the above material to Banbury mixer, and kneading for 2 minutes at 155° C. firstly after transferring mixture blended at 160° C. for 5 minutes to the mixing roll of 155° C. in preheating temperature, then kneading at 155° C. secondly for 2 minutes after transferring to the warming roll of 155° C. in preheating temperature, finally transferring that to the calendar;

after preparing the film of 0.3 mm in thickness on a lower portion roll preheated in 160° C. at the calender, rolling and cooling thru the emboss roll and cooling roll, the upper portion film or lower portion film of 0.2 mm in thickness of the present invention is prepared;

after loading the base material to the load roll 1 and loading the film of the upper and lower portions prepared to the load roll 2, 3, the base material passed in the base material preheating roll preheated in 100° C. to transfer to the main compression roll; the upper portion film is passed in the upper portion film preheating roll preheated in 75° C. to transfer to the main compression roll;

the lower portion film is passed in the lower portion film preheating roll preheated in 87° C. to transfer to the main compression roll; and the film of the upper and lower portions in the upper and lower portions of the base material are laminated in the main compression roll preheated in 155° C. and then becomes veneer board, final rolling and cooling thru the emboss roll and cooling roll, 0.65 mm in thickness of a coupling board product that the film of the upper and lower portions are coupled in the base material is prepared.

In the 120 mesh coating roll that 120 intaglio depressed groove for coating thickness control is carved inside 1 inch square of coating roll as a gravure 1 coating equipment, the polyurethane-cyano acrylate adhesives loaded in the bath is applied and the coupling board product is injected, and the adhesive layer as 5 to 20 μm of adhesive solid is coated with 0.015 mm in thickness in the upper or lower portion of the veneer board.

After coating, that is transferred to the dry oven in 70° C. of temperature and 15 m/min of transfer speed and then becomes dry, transferring to the 70 mesh coating roll that 70 intaglio depressed groove for coating thickness control is carved inside 1 inch square of coating roll as a gravure 2 coating equipment.

The surface treatment agent composed of fluorine-acryl resin loaded in the bath is applied to the 70 mesh coating roll, then coating one time the surface treatment agent layer of 0.035 mm in thickness with 20 to 30 μm solid of the surface treatment agent in the outside of the adhesive layer.

After coating the surface treatment agent, that is transferred to the dry oven of 70° C. in temperature and 15 m/min of transfer speed and then becomes dry to rewind by the gravure 2 coating equipment for coating 2, 3 times the surface treatment agent layer like the same constitution above, which produces 0.7 mm in whole thickness of tarpaulin non-processed fabric of the present invention; by injecting the tarpaulin non-processed fabric to the photographic printer, the tarpaulin as a processed product in the invention where the photographic print surface is directly printed in the outside of the surface treatment layer is finally prepared.

Embodiment 2

In the upper portion of the surface treatment layer of tarpaulin non-processed fabric prepared with the same process as embodiment 1, the tarpaulin of 0.8 mm in thickness that is a processed product of the invention is finally prepared by processing photographic print sheet of 0.1 mm thickness to lamination coupling.

Comparison Example 1

Purchase in the market a PVC tarpaulin of 0.7 mm in thickness which has a base material coated with the PVC resin in the prior PET fabric sheet and the photographic print surface printed in dual structure in the upper and lower portions of the base material.

Comparison Example 2

Purchase in the market a PE tarpaulin of 0.7 mm in thickness which has a base material coated with the LDPE resin in the prior HDPE YARN fabric sheet and the photographic print surface printed in dual structure in the upper and lower portions of the base material.

Test Method and the Results in Comparison Properties of Matter Value

A. Print Aptitude Test (Adhesive Property/Resolution/Dry Property)

Using XP-2506D digital printer of DGI company, tested adhesive property/resolution/dry property/crack based on the test method standard 'WPS-06-03-101 Print aptitude test' of Wonpoong Company, the results of properties of matter listed in Table 1.

1) Adhesive property: after a printing photographic print surface, check deformation, and break-away states of the photographic print surface with naked eye by testing after coupling the print surface with tape for 30 minutes of dry condition 2) Dry property: measuring all the dry time in the normal temp. by dry oven after printing photographic print surfaces 3) Crack generation or not: after printing, check with naked eye whether crack of film of upper and lower portions and print surfaces generates or not when folding non-processed fabric in dry states for 60 minutes 4) Resolution: measuring whether the printed color is clearly displayed to the outside or not by standard color difference sample.

TABLE 1

| Sections | Embodiment 1 | Embodiment 2 | Comparison example 1 | Comparison example 2 |
|---|---|---|---|---|
| Adhesive property | Good | Good | Good | Bad (break away) |
| Dry property | 10 minutes(A) | No need to dry(A) | 20 minutes(B) | 40 minutes(C) |
| Crack outbreak | none | none | none | Yes(faulty) |
| Resolution | Good | Good | Bad | Bad |

As seen in table 1, embodiments 1 and 2 of the present invention are used normally with no problem. Dropping of resolution in PVC tarpaulin products of comparison example 1 causes a problem in use, and remarkable dropping of adhesive property, dry property, crack generation, and resolution in PE tarpaulin of comparison example 2 causes problems in use, and represents best for embodiment 1 of the present invention.

B. Weather-Ability Test

Based on the test process standard 'WPS-06-03-102 weather-ability test process' of Wonpoong Company for testing the blazing phenomenon of the product, measures different color phenomenon against the first time using color difference meter, of Data-color spectra-flash SF600 for testing, after stagnating the sample in the UVCON tester from Atlas Company for 100 to 500 hours.

Here, $\Delta E$ is a color difference value, greater value of which means greater gap of different color phenomenon against the first time, and the results in property of matter are listed in table 2.

TABLE 2

| Sections | Embodiment 1 | Embodiment 2 | Comparison Ex1 | Comparison Ex2 |
|---|---|---|---|---|
| 100 HRS | $\Delta E = 0.67$ | $\Delta E = 0.73$ | $\Delta E = 1.20$ | $\Delta E = 1.40$ |
| 200 HRS | $\Delta E = 1.08$ | $\Delta E = 1.22$ | $\Delta E = 1.58$ | $\Delta E = 1.78$ |
| 300 HRS | $\Delta E = 1.23$ | $\Delta E = 1.78$ | $\Delta E = 2.20$ | $\Delta E = 2.78$ |
| 500 HRS | $\Delta E = 1.89$ | $\Delta E = 2.10$ | $\Delta E = 3.20$ | $\Delta E = 3.98$ |

As seen in table 2, embodiments 1, 2 of the present invention is excellent, still the product of comparison example 1, 2 is faulty as times go by, which causes a problem in use.

Accordingly, it can be seen that embodiments 1, 2 of the invention is the best.

C. Cold-Proof Test

Executed the test 'KS K-0766 cold-proof test process' of domestic KS standard for measuring cold-proof of the product, the results of properties of matter is listed in table 3.

TABLE 3

| Sections | Embodiment 1 | Embodiment 2 | Comparison Ex1 | Comparison Ex2 |
|---|---|---|---|---|
| −20 C. | NO CRACK | NO CRACK | NO CRACK | NO CRACK |
| −25 C. | NO CRACK | NO CRACK | CRACK | NO CRACK |
| −30 C. | NO CRACK | NO CRACK | CRACK | CRACK |

D. Abrasion Resistance Test

Measuring the loss weight by 'FS 5306 abrasion strength test process' of USA federal standard for testing the surface abrasion strength of the product, the results of properties of matter listed in table 4.

(Test condition: wheel no.: H-18, load: 1000 gr)

TABLE 4

| Sections | Embodiment 1 | Embodiment 2 | Comparison Ex1 | Comparison Ex2 | Comparison Ex3 |
|---|---|---|---|---|---|
| After 500 cycle | 0.86% | 0.73 | 1.2% | Tear off (faulty) | |
| After 1000 cycle | 1.45% | 1.26 | 2.4% | Faulty | |

E. Other Comparison Items

1) Whether a pollutant is generated or not: estimating upon the quality of material, the results listed in table 5.

2) Whether recycling material can be used or not: estimating upon the quality of material, the results listed in table 5.

3) The effect of cost down: estimating whether recycling material can be used or not and single or double provision structure of the photographic print surface (recording the comparing values of embodiments 1, 2 and comparison example 2 based on 1.0 time PVC tarpaulin of comparison example 1), and the results listed in Table 5.

4) Work efficiency: estimating work efficiency by comparing single or double structure of the photographic print surface.

TABLE 5

| Sections | Embodiment 1 | Embodiment 2 | Comparison Ex 1 | Comparison Ex2 |
|---|---|---|---|---|
| Pollutant occurrence | None | None | Endocrine disruptor | Not appeared |
| Use recycling material | 100% possible | 100% possible | Impossible in use | Possible in use |
| Cost down | 2 times | 2 times | 1 time | 1.5 times |
| Work efficiency | Good | Good | Down | Down |

As seen in Table 5, a pollutant is not generated in embodiments 1, 2 which include polyolefin based composition that is eco-friendly. After using, 100% recycling as recycle material of the product is possible, which causes cost down and excellent work efficiency due to recycling of recycle material and a single structure of the photographic print surface.

Comparison example 1 in the related art, which causes the problem of a pollutant due to generation of endocrine disruptor and dropping of work efficiency, and disabling use of recycling material.

Also, a pollutant is not generated in comparison example 2, and use of recycling material is possible, while it causes dropping of work efficiency and weak points in use due to a falling-off of properties of matter items A to D.

As seen in Table 5, a pollutant is not generated in embodiment 1, 2 which includes polyolefin based composition that is eco-friendly, after using that, 100% recycling as recycle material of the product is possible, which causes cost down and excellent work efficiency due to recycling of recycle material and single structure of the photographic print surface.

Comparison example 1 in the related art, which causes the problems of a pollutant due to generation of endocrine disruptor, dropping of work efficiency, and disabling the use of recycling material. Also, a pollutant is not generated in comparison example 2, and the use of recycling material is possible, while it causes dropping of work efficiency and weak points in use due to a falling off of properties of matter listed in the above A to D tests.

INDUSTRIAL APPLICABILITY

According to the polyolefin tarpaulin composition and preparing method thereof (thermo-plastic polyolefin based tarpaulin and preparing process thereof), the tarpaulin for photographic printing of the present invention provides a reinforced structure with united strength in the outside of tarpaulin, which represents a superior processing property that photographic print sheet maybe easily coupled to the outside of tarpaulin. Due to the constitution of a single photographic print surface, the photographic print surface is clearly printed, and therefore cost is reduced and work efficiency improved.

At the same time, the polyolefin tarpaulin composition and preparing method thereof (thermo-plastic polyolefin based tarpaulin and preparing process thereof) prevents crack states due to the elastic force of the base material, which reinforces cold-proof, weather-ability, and abrasion resistance.

Especially, the present invention prevents the generation of a pollutant that is a problem in PVC tarpaulin of the related art by creating an eco-friendly material and does not harm the human body, and enables 100% recycling as recycling raw material for reducing the cost after use.

The invention claimed is:

1. A thermo-plastic polyolefin based tarpaulin comprising:
  a base material impregnated with polypropylene resin in a fiber yarn with a thickness of 150 to 3000 denier, the fiber yarn being non-woven yarn or filament yarn;
  an upper film and a lower film disposed on an upper surface and a lower surface of the base material, respectively, each of the upper film and the lower film being made of thermo-plastic polyolefin based complex resin for reinforcing cold-proofing and abrasion resistance, and each of the upper film and the lower film including a filler, an ultraviolet light blocker, an antioxidant, and a static electricity blocker;
  an adhesive layer applied by polyurethane-cyano acrylate adhesives on an upper surface of the upper film;
  a surface treatment agent layer made of fluorine acrylic resin disposed on an upper surface of the adhesive layer for improving a print processing property and weather-ability by accommodating a polarity in printing a photographic print surface on the surface treatment agent layer;
  wherein the upper film and the lower film are made of:
  (i) 65 to 85 wt % thermo-plastic polyolefin based complex resin, wherein the thermo-plastic polyolefin based complex resin includes 40 to 60 wt % linear low-low density polyethylene resin (LLD PE) and 40 to 60 wt % thermo-plastic polyolefin based elastomer resin (TPE resin);
  (ii) 14.7 to 30 wt % Talc or CaCo3 as the filler;
  (iii) 0.1 to 2.0 wt % UV Stabilizer of bis sebaceate group or poly-tetra methylbutylamino group as the ultraviolet light blocker;
  (iv) 0.1 to 1.5 wt % phenol free processing stabilizer of phosphate & hydroxylamine group as the antioxidant; and
  (v) 0.1 to 1.5 wt % of monoglyceride as the static electricity blocker,
  wherein the linear low-low density polyethylene resin (LLD PE) has a density of 0.918 to 0.922 and a melting index 0.8 to 1.2,
  wherein the thermo-plastic polyolefin based elastomer resin (TPE resin) includes 55 to 65 wt % of rubber, 10 to 30 wt % of polypropylene, and 15 to 25 wt % of polyethylene, and
  wherein the adhesive layer consists of 5 to 20 wt % polyurethane-cyanacrylate based resin dissolved in 80 to 95 wt % solvent, the solvent including a material selected from the group consisting of methyl ethyl keton (MEK), dimethyl formamide (DMF), and ethylene acetate (EA).

2. The thermo-plastic polyolefin based tarpaulin according to claim 1, wherein the surface treatment agent layer consists of 20 to 30 wt % fluorine-acryl resin dissolved in 70 to 80 wt % of a solvent, the solvent including a material selected from the group consisting of methyl ethyl keton (MEK) and dimethyl formamide (DMF).

3. The thermo-plastic polyolefin based tarpaulin according to claim 1, further comprising a photographic print surface disposed on an upper surface of the surface treatment agent layer, and a protective film disposed on an upper surface of the photographic print surface.

4. The thermo-plastic polyolefin based tarpaulin according to claim 1, further comprising a photographic print surface disposed on each of an upper surface of the surface treatment agent layer and a lower surface of the lower film.

5. A thermo-plastic polyolefin based tarpaulin comprising:
  a base material impregnated with polypropylene resin in a fiber yarn with a thickness of 150 to 3000 denier, the fiber yarn being non-woven yarn or filament yarn;
  an upper film and a lower film disposed on an upper surface and a lower surface of the base material, respectively, each of the upper film and the lower film being made of thermo-plastic polyolefin based complex resin for reinforcing cold-proofing and abrasion resistance, and each of the upper film and the lower film including a filler, an ultraviolet light blocker, an antioxidant, and a static electricity blocker;
  an adhesive layer applied by polyurethane-cyano acrylate adhesives on an upper surface of the upper film;
  a surface treatment agent layer made of fluorine acrylic resin disposed on an upper surface of the adhesive layer for improving a print processing property and weather-ability by accommodating a polarity in printing a photographic print surface on the surface treatment agent layer;
  wherein the upper film and the lower film are made of:
  65 to 85 wt % thermo-plastic polyolefin based complex resin, wherein the thermo-plastic polyolefin based complex resin includes 40 to 60 wt % linear low-low density polyethylene resin (LLD PE) and 40 to 60 wt % thermo-plastic polyolefin based elastomer resin (TPE resin);
  (ii) 14.7 to 30 wt % Talc or CaCo3 as the filler;
  (iii) 0.1 to 2.0 wt % UV Stabilizer of bis sebaceate group or poly-tetra methylbutylamino group as the ultraviolet light blocker;
  (iv) 0.1 to 1.5 wt % phenol free processing stabilizer of phosphate & hydroxylamine group as the antioxidant; and
  (v) 0.1 to 1.5 wt % of monoglyceride as the static electricity blocker,
  wherein the linear low-low density polyethylene resin (LLD PE) has a density of 0.918 to 0.922 and a melting index 0.8 to 1.2, wherein the thermo-plastic polyolefin based elastomer resin (TPE resin) includes 55 to 65 wt % of rubber, 10 to 30 wt % of polypropylene, and 15 to 25 wt % of polyethylene, and wherein the surface treatment agent layer consists of 20 to 30 wt % fluorine-acryl resin dissolved in 70 to 80 wt % of a solvent, the solvent including a material selected from the group consisting of methyl ethyl keton (MEK) and dimethyl formamide (DMF).

6. The thermo-plastic polyolefin based tarpaulin according to claim 5, further comprising a photographic print surface disposed on an upper surface of the surface treatment agent layer, and a protective film disposed on an upper surface of the photographic print surface.

7. The thermo-plastic polyolefin based tarpaulin according to claim 5, further comprising a photographic print surface disposed on each of an upper surface of the surface treatment agent layer and a lower surface of the lower film.

* * * * *